United States Patent
Himmelmann

(10) Patent No.: US 11,359,635 B2
(45) Date of Patent: Jun. 14, 2022

(54) POWER MODULES WITH REGENERATIVE COMPRESSOR WHEELS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 367 days.

(21) Appl. No.: 16/383,628

(22) Filed: Apr. 14, 2019

(65) Prior Publication Data

US 2020/0325904 A1  Oct. 15, 2020

(51) Int. Cl.

| F04D 23/00 | (2006.01) |
|---|---|
| B64C 27/08 | (2006.01) |
| F01D 15/08 | (2006.01) |
| F01D 15/10 | (2006.01) |

(52) U.S. Cl.
CPC ............ *F04D 23/008* (2013.01); *B64C 27/08* (2013.01); *F01D 15/08* (2013.01); *F01D 15/10* (2013.01); *B64C 2201/024* (2013.01); *B64C 2201/042* (2013.01); *B64C 2201/06* (2013.01); *B64C 2201/108* (2013.01); *B64C 2201/162* (2013.01)

(58) Field of Classification Search
None
See application file for complete search history.

(56) References Cited

U.S. PATENT DOCUMENTS

| 5,364,228 | A | * | 11/1994 | Henning | ............... | F04D 23/008 |
| | | | | | | 415/143 |
| 5,497,615 | A | * | 3/1996 | Noe | ...................... | B60L 3/0061 |
| | | | | | | 60/39.511 |
| 5,899,673 | A | * | 5/1999 | Bosley | .................. | F04D 23/008 |
| | | | | | | 417/423.14 |
| 7,001,162 | B2 | | 2/2006 | Choroszylow et al. | | |
| 9,976,564 | B2 | * | 5/2018 | Bueche | ................. | F04D 29/444 |
| 10,641,123 | B1 | * | 5/2020 | Narcus | .................. | F01D 25/125 |
| 2009/0158739 | A1 | | 6/2009 | Messmer | | |
| 2010/0219638 | A1 | * | 9/2010 | Gozdawa | ................ | F01D 15/10 |
| | | | | | | 290/52 |
| 2018/0156112 | A1 | * | 6/2018 | Mohseni | ................. | F24D 12/00 |

FOREIGN PATENT DOCUMENTS

| JP | H11311243 A | 11/1999 |
| WO | 0218793 A1 | 3/2002 |

OTHER PUBLICATIONS

European Search Report; Application No. 19216265.9-1007; dated Aug. 18, 2020; 6 pages.

* cited by examiner

*Primary Examiner* — Jason H Duger
(74) *Attorney, Agent, or Firm* — Cantor Colburn LLP

(57) ABSTRACT

A power module includes a turbine arranged along a rotation axis, an interconnect shaft fixed in rotation relative to the turbine, and a compressor with a regenerative compressor wheel. The regenerative compressor wheel is fixed in rotation relative to the interconnect shaft supported for rotation with the turbine about the rotation axis. Generator arrangements, unmanned aerial vehicles, and methods of generating electrical power are also described.

9 Claims, 4 Drawing Sheets

200

210 — RECEIVING AMBIENT AIR AT A POWER MODULE HAVING A TURBINE ARRANGED ALONG ALONG A ROTATION AXIS, AN INTERCONNECT SHAFT FIXED IN ROTATION RELATIVE TO THE TURBINE, AND A COMPRESSOR HAVING A REGENERATIVE COMPRESSOR WHEEL FIXED TO THE INTERCONNECT SHAFT

220 — SUPPORTING THE COMPRESSOR AND THE TURBINE WITH A FIRST PORTION OF COMPRESSED AIR FROM THE COMPRESSOR
- 222 FIRST AIR BEARING
- 224 SECOND AIR BEARING

230 — COOLING A PERMANENT MAGNET GENERATOR ARRANGED AXIALLY BETWEEN THE COMPRESSOR AND THE TURBINE WITH THE FIRST PORTION OF COMPRESSED AIR FROM THE COMPRESSOR

240 — COMPRESSING A SECOND PORTION OF COMPRESSED AIR FROM THE COMPRESSOR

240 — COMMUNICATING THE SECOND PORTION OF COMPRESSED AIR TO THE TURBINE TO THE TURBINE TO GENERATE ELECTRICAL WITH THE POWER MODULE

POWER MODULES WITH REGENERATIVE COMPRESSOR WHEELS

BACKGROUND

The present disclosure generally relates to electrical power generation, and more particularly to power modules employing regenerative compressor wheels to generate electrical power.

Unmanned aerial vehicles are commonly used in military and commercial applications for purposes of surveillance, mapping, infrastructure inspection, law enforcement, agriculture, delivery, search and rescue, and recreation by way of non-limiting example. Unmanned aerial vehicles come in a variety of sizes, form micro surveillance drones the size of an insect to large aircraft-scale unmanned aerial vehicles. The power supply for an unmanned vehicle generally corresponds to the size of the unmanned aerial vehicle. For example, large unmanned aerial vehicles typically employ jet engines, turboprops, or reciprocating internal combustion engines for power. Mini and micro unmanned aerial vehicles typically employ battery power to provide energy during missions.

Medium-sized unmanned aerial vehicles, e.g., those requiring between 1 kilowatt and 30 kilowatts of power, can be limited to relatively short duration missions because the energy density of batteries is typically too low to work at these power levels while jet engines and reciprocating engines can be inefficient at these power levels. While tethered unmanned vehicles, i.e., unmanned vehicles tethered to a remote power source, can provide relatively long mission times, the tether can limit the operating height and distance over which a tethered unmanned aerial vehicle can operate.

Such systems and methods have generally been satisfactory for their intended purpose. However, there remains a need for improved power modules, generator arrangements and unmanned aerial vehicles with power modules, and methods of generating electrical power. The present disclosure provides a solution to this need.

BRIEF DESCRIPTION

A power module is provided. The power module includes a turbine arranged along a rotation axis, an interconnect shaft fixed in rotation relative to the turbine, and a compressor. The compressor includes a regenerative compressor wheel fixed in rotation relative to the interconnect shaft supported for rotation with the turbine about the rotation axis.

In addition to one or more of the features described above, or as an alternative, further embodiments may include that the power modules has a permanent magnet generator operably connected to the turbine and arranged axially between the turbine and the regenerative compressor wheel.

In addition to one or more of the features described above, or as an alternative, further embodiments may include that the permanent magnet generator has one or more permanent magnet fixed relative to the interconnect shaft.

In addition to one or more of the features described above, or as an alternative, further embodiments may include that the permanent magnet generator has a stator coil or winding arranged radially outward of the interconnect shaft and in fluid communication with the regenerative compressor wheel to receive coolant therefrom.

In addition to one or more of the features described above, or as an alternative, further embodiments may include an air bearing arranged axially between turbine and the regenerative compressor wheel, the air bearing supporting the turbine and the regenerative compressor wheel for rotation about the rotation axis.

In addition to one or more of the features described above, or as an alternative, further embodiments may include that the air bearing is in fluid communication with the regenerative compressor wheel to receive a flow of compressed air from the regenerative compressor wheel.

In addition to one or more of the features described above, or as an alternative, further embodiments may include that the air bearing is a first air bearing and that the power module includes a second air bearing supporting the turbine and the regenerative compressor wheel for rotation about the rotation axis; and a permanent magnet generator arranged axially between the first air bearing and the second air bearing, wherein the second air bearing is in fluid communication with the regenerative compressor wheel through both the first air bearing and the permanent magnet generator.

In addition to one or more of the features described above, or as an alternative, further embodiments may include that the power module includes a radial compressor in fluid communication with the regenerative compressor wheel, the radial compressor arranged on a side of the regenerative compressor wheel axially opposite the turbine.

In addition to one or more of the features described above, or as an alternative, further embodiments may include that the compressor has a diffuser arranged axially between the radial compressor and the regenerative compressor wheel.

In addition to one or more of the features described above, or as an alternative, further embodiments may include that the power module has a gas generator fluidly coupling the regenerative compressor wheel to the turbine.

In addition to one or more of the features described above, or as an alternative, further embodiments may include a fuel module in fluid communication with the gas generator, the fuel module having a liquid fuel charge contained within a fuel pressure vessel; and a compressed air charge in fluid communication with the turbine through the fuel pressure vessel, the compressed air charge pressurizing the liquid fuel charge.

In addition to one or more of the features described above, or as an alternative, further embodiments may include that the turbine is a microturbine or an impulse turbine.

In addition to one or more of the features described above, or as an alternative, further embodiments may include that the turbine includes a single turbine stage.

In addition to one or more of the features described above, or as an alternative, further embodiments may include that the power module has an outlet port in fluid communication with the regenerative compressor wheel, the outlet port defined by the power module between the regenerative compressor wheel and the turbine.

A generator arrangement is also provided. The generator arrangement includes a power module as described above, wherein the turbine is an impulse turbine; an air bearing arranged axially between turbine and the regenerative compressor wheel, the air bearing supporting the turbine and the regenerative compressor wheel for rotation about the rotation axis; a radial compressor in fluid communication with the regenerative compressor wheel, the radial compressor arranged on a side of the regenerative compressor wheel axially opposite the turbine; and a gas generator fluidly coupling the regenerative compressor wheel to the turbine.

An unmanned aerial vehicle is additionally provided. The unmanned aerial vehicle includes an airframe carrying an electrical load; a power module as described above, wherein the power module is carried by the unmanned aerial vehicle and is electrically connected to the electrical load; and a fuel module in fluid communication with the power module.

A method of generating electrical power is also provided. The method includes receiving ambient air at a power module having a turbine arranged along a rotation axis, an interconnect shaft fixed in rotation relative to the turbine, and a compressor having a regenerative compressor wheel fixed to the interconnect shaft; supporting the compressor and the turbine with a first portion of compressed air from the compressor; compressing a second portion of compressed air from the compressor; and communicating the second portion of compressed air to the turbine to the turbine to generate electrical power with the power module.

In addition to one or more of the features described above, or as an alternative, further embodiments may include that the method also includes cooling a permanent magnet generator arranged axially between the compressor and the turbine with the first portion of compressed air from the compressor.

Technical effects of the present disclosure includes the capability to generate electrical power using a relatively lightweight and efficient portable generator module. In certain embodiments the power module has greater power density than battery-powered systems. In accordance with certain embodiments the power module can be refueled relatively quickly, e.g., more rapidly than the time required to recharge a battery module. It is also contemplated that the power module not include a fuel pumping system, reducing the cost and/or complexity of the power module. It is additionally contemplated that the power module employ a relatively common fuel, such as a liquid fuel like JP-8, kerosene, or diesel fuel.

BRIEF DESCRIPTION OF THE DRAWINGS

The following descriptions should not be considered limiting in any way. With reference to the accompanying drawings, like elements are numbered alike:

FIG. 7 is a block diagram of a method of generating electrical power, showing operations of the method according to an embodiment.

DETAILED DESCRIPTION

Figure 1:
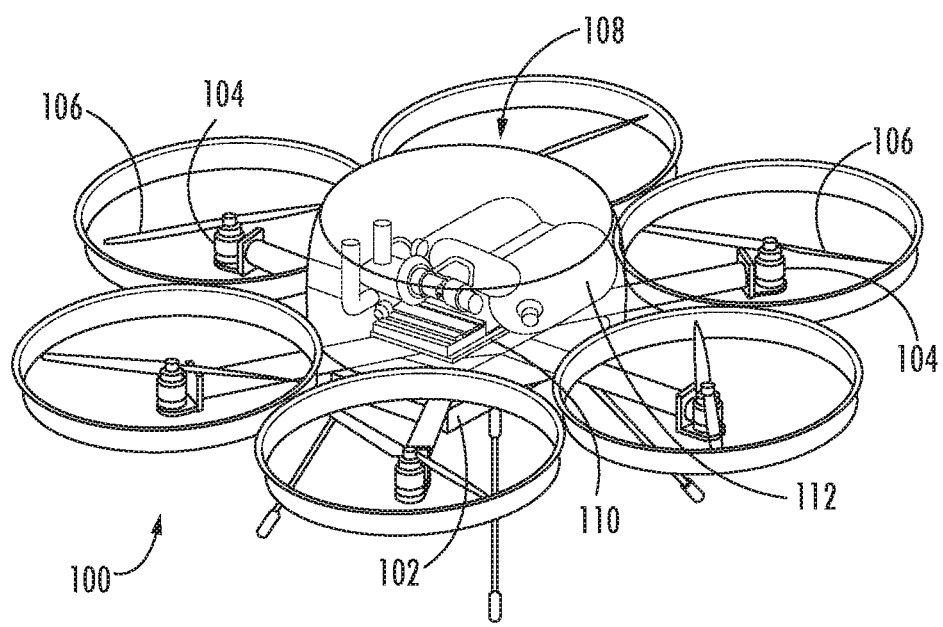
FIG. 1 is a perspective view of an unmanned aerial vehicle constructed in accordance with the present disclosure, showing a generator arrangement with a power module and a fuel module.

Reference will now be made to the drawings wherein like reference numerals identify similar structural features or aspects of the subject disclosure. For purposes of explanation and illustration, and not limitation, a partial view of an exemplary embodiment of power module in accordance with the disclosure is shown in FIG. 1 and is designated generally by reference character 100. Other embodiments of power modules, generator arrangements and unmanned aerial vehicles with power modules, and methods of generating electrical power in accordance with the present disclosure, or aspects thereof, are provided in FIGS. 2-7, as will be described. The systems and methods described herein can be used generating electrical power in unmanned aerial vehicles, such as in medium sized autonomous vehicles, though the present disclosure is not limited to autonomous aerial vehicles or to autonomous aerial vehicles in general.

Referring to FIG. 1, an unmanned aerial vehicle 100 is shown. The unmanned aerial vehicle 100 includes an airframe 102, an electrical load 103 including a plurality of electric motors 104 with a plurality of rotors 106, and a generator arrangement 108. The rotors 106 operably associated with the electric motors 104. The electric motors 104 are affixed the airframe 102 and are electrically connected to the generator arrangement 108. The generator arrangement 108 is carried by the airframe 102 and is configured to provide electric power to the electric motors 104. More specifically, the generator arrangement 108 is configured to provide electric power to the electric motors 104 by cooperation of a power module 110 and a fuel module 112 carried by the airframe 102, as will be described.

In certain embodiments the unmanned aerial vehicle 100 is a medium-sized unmanned aerial vehicle, e.g., having a weight of about 300 pounds (about 136 kilograms). In accordance with certain embodiments the generator arrangement 108 has a power generating capability of about seven (7) kilowatts for about ten (10) hours. It is also contemplated that, in accordance with certain embodiments, that the generator arrangement 108 have a total mass inclusive of fuel of less than about 80 pounds (about 36 kilograms). Although shown and described herein in the context of an unmanned aerial vehicle 100 it is to be understood and appreciated that other type of electrical systems can also benefit from the present disclosure, such as mobile terrestrial electrical system.

Figure 2:
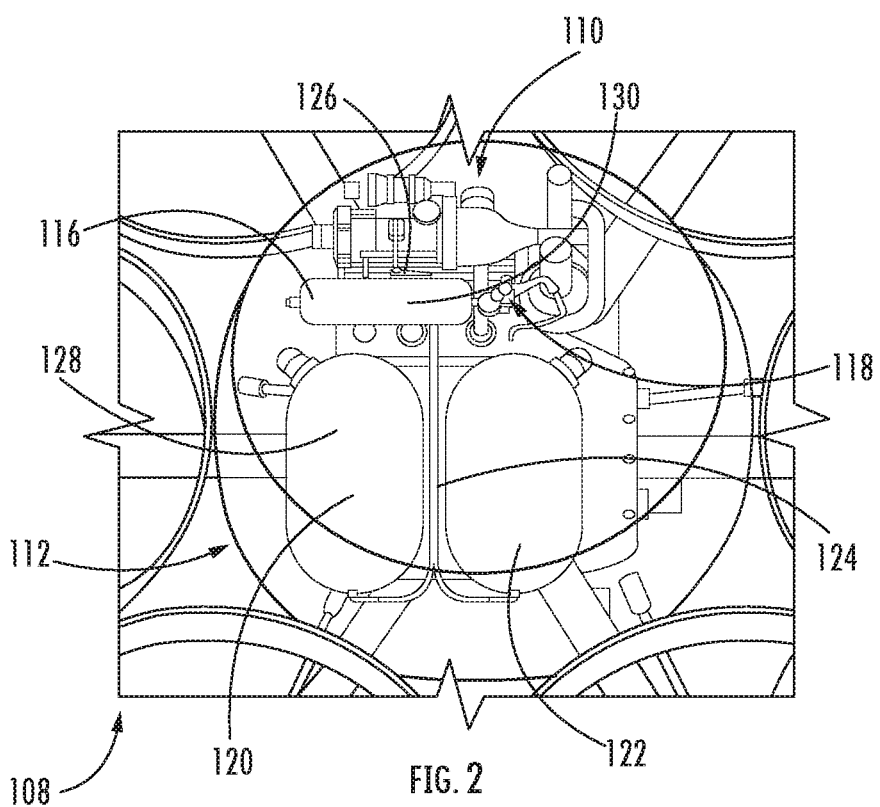
FIG. 2 is a perspective of a portion of the generator arrangement of FIG. 1, showing fuel pressure vessels and a compressed gas pressure vessel of the fuel module for generating electric power with the power module.

Referring to FIG. 2, the generator arrangement 108 is shown. The fuel module 112 is in fluid communication with the power module 110 and is arranged to provide a flow of liquid fuel 114 to the power module 110. In this respect the fuel module 112 is configured as a blowdown fuel module including a compressed gas pressure vessel 116, a compressed gas header 118, and first fuel pressure vessel 120. The fuel module 112 also includes a second fuel pressure vessel 122, a fuel header 124, and turbine speed control valve 126. A charge of liquid fuel 128 is contained in the first fuel pressure vessel 120 and the second fuel pressure vessel 122, and a charge of compressed gas 130 is contained in the compressed gas pressure vessel 116. The charge of compressed gas 130 can include, for example air or substantially pure nitrogen.

The compressed gas pressure vessel 116 is connected to the compressed gas header 118. The compressed gas header 118 is connected to the first fuel pressure vessel 120 and the second fuel pressure vessel 122. The first fuel pressure vessel 120 and the second fuel pressure vessel 122 are connected to the fuel header 124 and therethrough to the power module 110 through the turbine speed control valve 126. Connection of the compressed gas pressure vessel 116 to the first fuel pressure vessel 120 and the second fuel pressure vessel 122 through the compressed gas header 118 allow the compressed gas 130 within the compressed gas pressure vessel 116 to pressurize the liquid fuel 128 communicated to the turbine speed control valve 126, simplifying the arrangement of the generator arrangement 108 by allowing the generator arrangement 108 to operate without a mechanical fuel pump. In this respect it is contemplated that the turbine speed control valve 126 include a variable orifice or similar constant-pressure fuel metering apparatus. In certain embodiments the liquid fuel 128 is a kerosene-based fuel, such as JP-8. In accordance with certain embodiments the compressed gas 130 is air.

Figure 3:
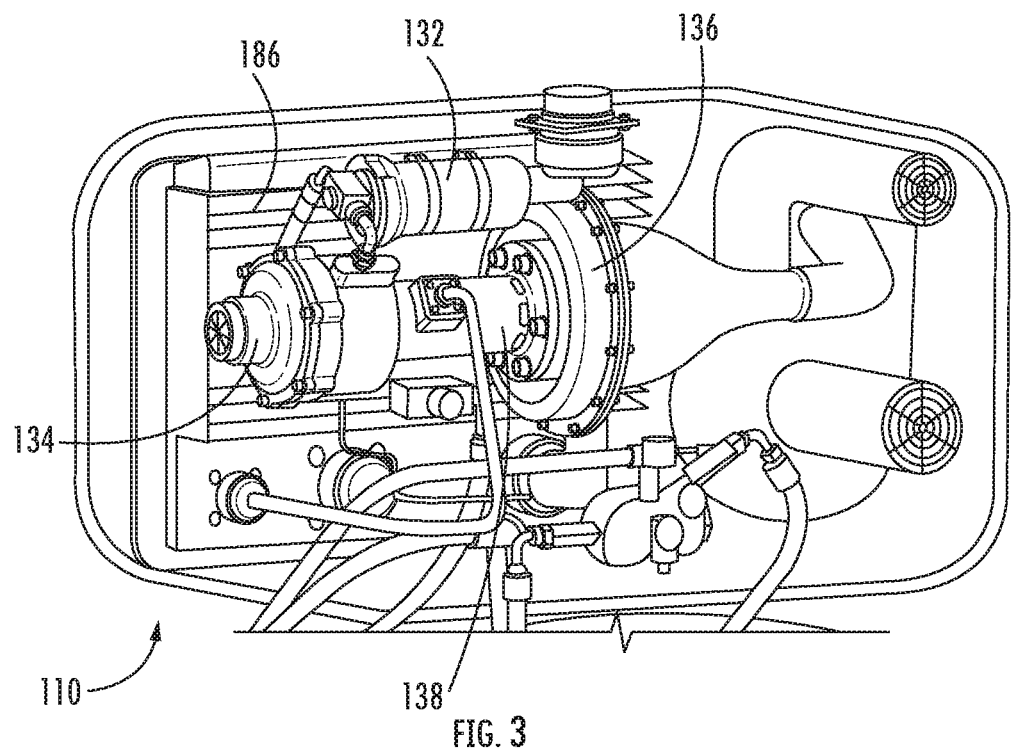
FIG. 3 is a perspective view of the power module of FIG. 1, showing a turbine speed valve operably connected to a permanent magnet generator through a gas generator and a turbine to oxidize fuel from the fuel module using compressed air from a compressor.

With reference to FIG. 3, the power module 110 is shown. The power module 110 is in fluid communication with the fuel module 112 (shown in FIG. 1) to receive a flow of liquid fuel 128 (shown in FIG. 4) and includes a gas generator 132, a compressor 134, and a turbine 136. The power module 110 also includes a permanent magnet generator 138, an interconnect shaft 140 (shown in FIG. 5), a first air bearing 142 (shown in FIG. 5), and a second air bearing 144 (shown in FIG. 5).

Figure 4:
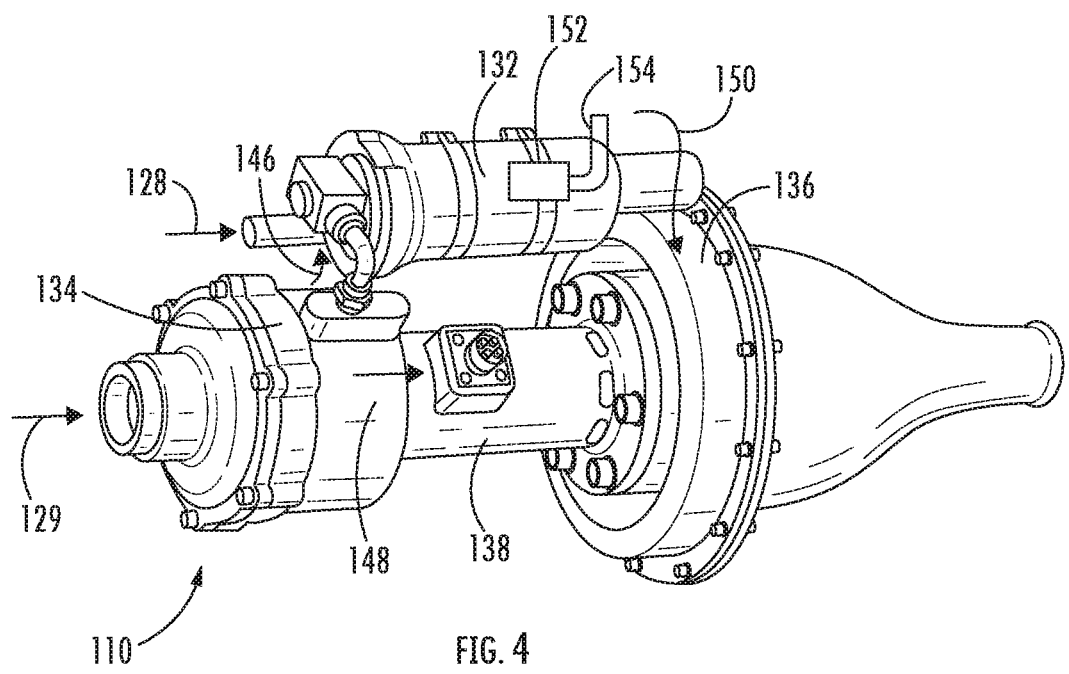
FIG. 4 is a perspective view of the power module of FIG. 1, showing the compressor and the turbine arrangement at axially opposite ends of the permanent magnet generator and coolant outlet ports defined between the permanent magnet generator and the turbine.

With reference to FIG. 4, the power module 110 is shown. The compressor 134 is configured to compress ambient air 129 ingested from the external environment and is operatively associated with the turbine 136. A first compressed air portion 146 is provided to the gas generator 132 as an oxidizer for a flow of liquid fuel 128 provided thereto by the turbine speed control valve 126 (shown in FIG. 2). A second compressed air portion 148 is provided to the first air bearing 142 (shown in FIG. 5) and the second air bearing 144 (shown in FIG. 5) for supporting the turbine 136 and the compressor for rotation about a rotation axis 164. The second compressed air portion 148 is also provided to the permanent magnet generator 138 for purposes of cooling the permanent magnet generator 138.

The gas generator 132 is configured and adapted to generate a flow of high pressure combustion products 150 and is in fluid communication with fuel module 112, the compressor 134, and the turbine 136. In this respect the gas generator 132 includes a combustor 152 and a glow-plug or igniter element 154. The glow-plug or igniter element 154 is fixed to the combustor 152. The combustor 152 is disposed in fluid communication with the turbine speed control valve 126 to receive a flow of the liquid fuel 128, is also disposed in fluid communication with the compressor to receive the second compressed air portion 148 from the compressor 134, and is additionally in fluid communication with the turbine 136 to communicate the flow of high pressure combustion products 150 thereto.

Figure 5:
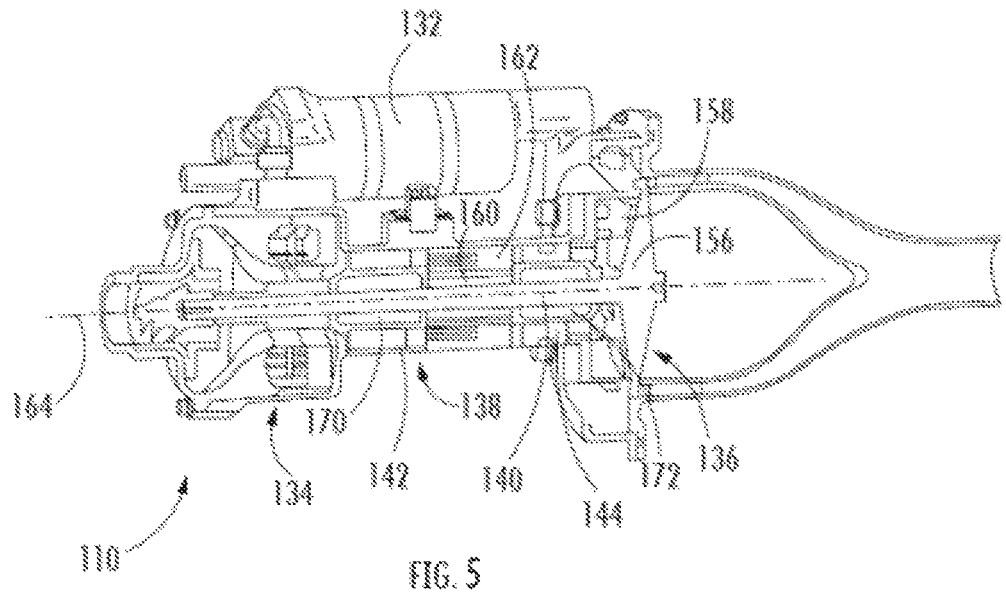
FIG. 5 is a partial cross-sectional view of the power module of FIG. 1, showing a radial compressor coupled to a regenerative compressor wheel of the compressor for providing compressed air to air bearings and as oxidizer to a gas generator of the power module.

With reference to FIG. 5, the power module 110 is shown. The turbine 136 is in fluid communication with the gas generator 132 to receive the flow of high pressure combustion products 150 (shown in FIG. 4) therefrom, and is operably connected to the permanent magnet generator 138 and the compressor 134 by the interconnect shaft 140. In this respect the turbine 136 is configured to expand the flow of high pressure combustion products 150 received from the gas generator 132, extract mechanical work therefrom, and communicate the mechanical work to the permanent magnet generator 138 and the compressor 134 to generate electric power and compress air ingested from the from the ambient environment, respectively. In certain embodiments the turbine 136 is a micro turbine, e.g., is on the order of about four (4) inches (10.2 centimeters) in diameter. In accordance with certain embodiments the turbine 136 includes an impulse turbine 156 operably connected to the compressor 134 and the permanent magnet generator 138, providing radial compactness to the turbine 136. It is also contemplated that, in accordance with certain embodiments, the turbine 136 include a single turbine stage 158 to provide axial compactness to the turbine 136.

The permanent magnet generator 138 is configured and adapted for generating a flow of variable frequency alternating current (AC) power and is arranged axially between the turbine 136 and the compressor 134. In this respect the permanent magnet generator 138 includes one or more permanent magnet 160 and a coil or winding 162. The permanent magnet 160 is fixed in rotation relative to the interconnect shaft 140 for rotation therewith about a rotation axis 164. The stator coil or winding 162 is fixed relative to the gas generator 132, is magnetically coupled the permanent magnet 160, and is electrically connected to a power converter 186 (shown in FIG. 3), which is in turn configured to convert the variable frequency AC power into constant frequency power, e.g., direct current (DC) power, for provision to the electric motors 104. In certain embodiments the permanent magnet generator 138 is an alternator-type generator, providing the generator arrangement 108 with power density suitable for medium-sized unmanned aerial vehicles. In accordance with certain embodiments the permanent magnet generator 138 can be used as a starter motor for the power module 110.

The first air bearing 142 and the second air bearing 144 are arranged along the rotation axis 164 on axially opposite ends of the permanent magnet generator 138. More specifically, the first air bearing 142 is arranged axially between the compressor 134 and the permanent magnet generator 138 and the second air bearing 144 is arranged axially between the permanent magnet generator 138 and the turbine 136. This provides a balanced and axially compact arrangement to the power module 110. In certain embodiments the first air bearing 142 includes a foil-air bearing 170. In accordance with certain embodiments the second air bearing 144 includes a foil-air bearing 172. Foil-air bearings allow the power module 110 to operate at high rotational speeds and without a lubricant by floating the rotary member, e.g., the interconnect shaft 140 and/or the compressor 134 and the turbine 136, using the first compressed air portion 146.

Figure 6:
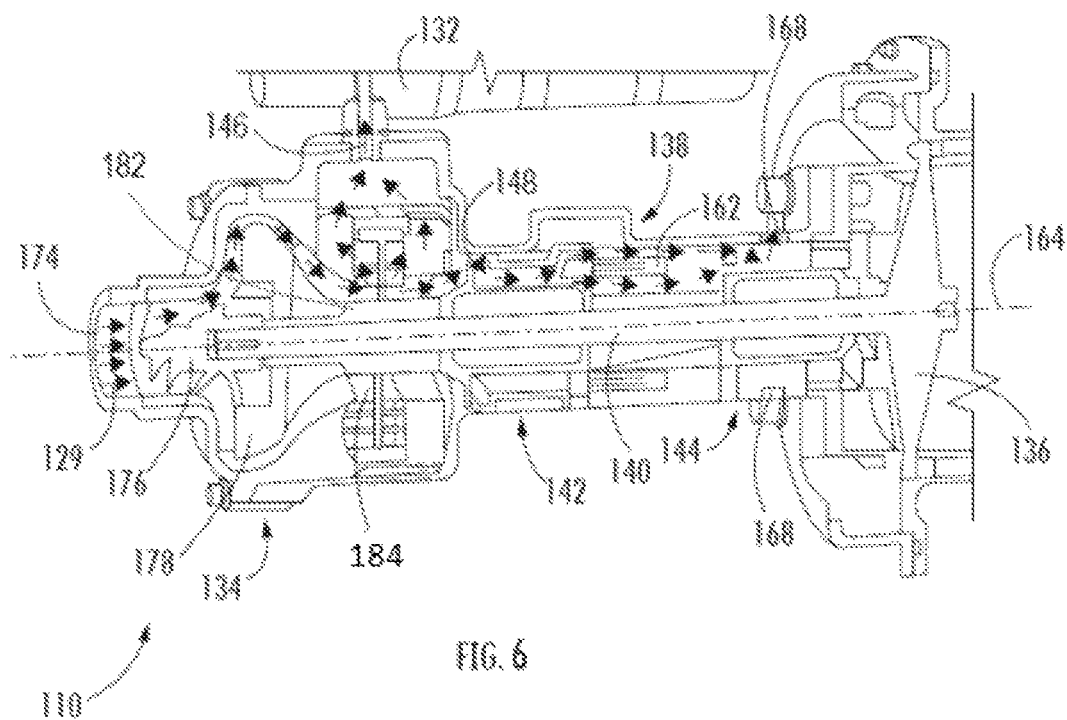
FIG. 6 is a partial cross-sectional view of the power module of FIG. 1, showing air ingested by the compressor being compressed and divided by the compressor for providing to the gas generator as an oxidizer and coolant for the permanent magnet generator, respectively.

With reference to FIG. 6, air flows through the power module 110 are shown. It is contemplated that the first air bearing 142 and the second air bearing 144 each be in fluid communication with the compressor 134 for supporting the interconnect shaft 140, and therethrough the compressor 134 and the turbine 136, for rotation about the rotation axis 164. In this respect the compressor 134 is in fluid communication with the first air bearing 142. The first air bearing 142 is in turn in fluid communication with the permanent magnet generator 138. The permanent magnet generator 138 is in fluid communication with the second air bearing 144, and the second air bearing 144 is in turn in fluid communication with the ambient environment through an outlet port 168.

During operation the first air bearing 142 receives a flow of compressed air, e.g., a first compressed air portion 146, from the compressor 134. The first compressed air portion 146 is relatively low pressure and is communicated from the radially inner first stage of the compressor 134, which also forms the inlet of the radially outer second stage of the compressor 134, to the first air bearing 142. The first air bearing 142 in turn communicates the first compressed air portion 146 to the permanent magnet generator 138, wherein the first compressed air portion 146 cools the stator coil or winding 162 of the permanent magnet generator 138 prior to communication therefrom to the second air bearing 144. The second air bearing 144 thereafter communicates the first compressed air portion 146 to the ambient environment through a outlet port 168, which is arranged axially between the second air bearing 144 and the turbine 136 and is fluidly coupled to the external environment. As will be appreciated, issuing the heated coolant (i.e. the first compressed air portion 146) through the outlet port 168 thermally separates the turbine 136 from the permanent magnet generator 138, allowing the turbine 136 to be arranged close to the permanent magnet generator 138 notwithstanding its high operating temperature without limiting the reliability of the permanent magnet generator 138.

The compressor 134 is arranged along the rotation axis 164 opposite the turbine 136, is spaced apart therefrom by the permanent magnet generator 138 and the interconnect shaft 140, and is configured to provide compress the ambient air 129 ingested from the external environment to the generate the first compressed air portion 146 and the second compressed air portion 148. In this respect the compressor 134 includes an inlet 174, a radial compressor 176, and a diffuser 178. The compressor 134 also includes regenerative compressor wheel 182.

The inlet 174 is arranged along the rotation axis 164 on an end of the power module 110 opposite the turbine 136. The radial compressor 176 is arranged axially between the inlet 174 and the diffuser 178 and is configured to pressurize the ambient air 129 ingested from the ambient environment to a first pressure. The diffuser 178 is arranged axially between the radial compressor 176 and the regenerative compressor wheel 182 and is configured to guide the air pressurized to the first pressure to a collection channel 184 of the regenerative compressor wheel 182. The regenerative compressor wheel 182 is in turn arranged between the diffuser 178 and the first air bearing 142, and is configured to divide the air pressurized to the first pressure received from the diffuser 178 into the first compressed air portion 146 and the second compressed air portion 148. The first compressed air portion 146 is communicated to the outlet port 168 through the first air bearing 142, the permanent magnet generator 138, and the second air bearing 144. The second compressed air portion 148 is further compressed by the regenerative compressor wheel 182 and communicated to the gas generator 132 to a second pressure suitable for oxidizing the liquid fuel 114 received thereby in the gas generator 132. It is contemplated that the second pressure be such that turbine 136 operate as a supersonic partial admission turbine or a supersonic full admission turbine. In certain embodiments the pressure ratio provided by the compressor 134, and more specifically the regenerative compressor wheel 182 radially outer second stage, is about 50:1, which allows the power module 110 to operate without requiring an on-board oxidizer, e.g., using the ambient air 129.

With reference to FIG. 7, a method 200 of generating electric power is shown. The method 200 includes receiving ambient air at a power module having a turbine arranged along a rotation axis, an interconnect shaft fixed in rotation relative to the turbine, and a compressor having a regenerative compressor wheel fixed to the interconnect shaft, e.g., the ambient air 129 (shown in FIG. 4) at the power module 110 (shown in FIG. 1), as shown with box 210. The ambient air is compressed by the radial compressor and divided into a first compressed air portion and a second air portion, e.g., the first compressed air portion 146 (shown in FIG. 4) and the second compressed air portion 148 (shown in FIG. 4), by the regenerative compressor wheel.

As shown with box 220, the compressor and the turbine are supported with the first compressed air portion from the radial compressor. In this respect the first compressed air portion is communicated to a first air bearing, e.g., the first air bearing 142 (shown in FIG. 5), as shown with box 222. The compressed air portion thereafter communicated to a second air bearing, e.g., the second air bearing 144 (shown in FIG. 5), as shown with box 224. It is also contemplated that the first air portion be communicated to a permanent magnet generator, e.g., the permanent magnet generator 138 (shown in FIG. 3), as shown with box 230, the first compressed air portion cooling the permanent magnet generator as the first compressed air portion traverses the permanent magnet generator.

As shown with box 240, the second compressed air portion from the compressor is further compressed by the regenerative compressor wheel. Once further compressed the second compressed air portion is communicated to the turbine. Specifically, the second compressed air portion is communicated to a gas generator, e.g., the gas generator 132, where it oxidizes liquid fuel to generate a flow of high pressure combustion produces, which the gas generator provides to the turbine. The turbine in turn expands the high pressure combustion products, extracts work therefrom, and applies the work to the permanent magnet generator and the compressor as mechanical rotation.

Medium-sized unmanned aerial vehicles, such as those with power levels between about one (1) kilowatt and about thirty (30) kilowatts, can have relatively short mission times. This is because the energy density of batteries is generally too low to work as these power levels and internal combustion engines and jet engines is generally too low at these energy levels. While unmanned aerial vehicles having power levels within this range can be powered by remote power supplies by tethering, the operational constraints imposed by a tether in terms of limited range and height generally limit the utility of the unmanned aerial vehicle.

In embodiments described herein a regenerative compressor wheel is used to generate a very high compressor ratio within a single compressor stage to generate electrical power a turbine. In certain embodiments a lightweight, high efficiency Brayton cycle-based, micro turbine is used to operate an alternator. In accordance with certain embodiments the turbine utilizes a kerosene-based fuel, such as JP-8, a primary fuel and atmospheric air as the fuel oxidizer. It contemplated that, in accordance with certain embodiments, a micro turbo alternator achieved high efficiency by operating a supersonic partial admission turbine at a very high pressure ratio, e.g., with a pressure ratio of about 50:1.

The use of a high pressure ratio Brayton cycle-based micro turbo alternator provides relatively long operating time to a generator arrangement for a fixed volume of fuel and compressed air. In certain embodiments this is accomplished by using atmospheric air as the primary oxidant for a kerosene-based fuel, such as JP-8. Use of atmospheric air as the oxidant eliminates the need to carry an oxidant in a dedicated storage vessel.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An unmanned aerial vehicle, comprising:
   an airframe carrying an electrical load;
   a power module, comprising:
   a turbine arranged along a rotation axis;
   an interconnect shaft fixed in rotation relative to the turbine; and
   a compressor with a compressor wheel fixed in rotation relative to the interconnect shaft supported for rotation with the turbine about the rotation axis,
   wherein
   the power module is carried by the unmanned aerial vehicle and is electrically connected to the electrical load;
   a fuel module in fluid communication with the power module, wherein the fuel module is a blowdown fuel module;
   wherein the turbine is an impulse turbine;
   an air bearing arranged axially between the turbine and the compressor wheel, the air bearing supporting the turbine and the compressor wheel for rotation about the rotation axis;
   a radial compressor in fluid communication with the compressor wheel, the radial compressor arranged on a side of the compressor wheel axially opposite the turbine
   a gas generator fluidly coupling the compressor wheel to the turbine;
   an outlet port in fluid communication with the compressor wheel, the outlet port defined by the power module between the compressor wheel and the turbine.

2. The vehicle as recited in claim 1, further comprising a permanent magnet generator operably connected to the turbine and arranged axially between the turbine and the compressor wheel.

3. The vehicle as recited in claim 2, further comprising one or more permanent magnet fixed relative to the interconnect shaft.

4. The vehicle as recited in claim 2, further comprising a stator coil or winding arranged radially outward of the interconnect shaft and in fluid communication with the compressor wheel to receive coolant therefrom.

5. The vehicle as recited in claim 1, wherein the air bearing is in fluid communication with the compressor wheel to receive a flow of compressed air from the compressor wheel.

6. The vehicle as recited in claim 1, wherein the air bearing is a first air bearing and further comprising:
   a second air bearing supporting the turbine and the compressor wheel for rotation about the rotation axis; and
   a permanent magnet generator arranged axially between the first air bearing and the second air bearing, wherein the second air bearing is in fluid communication with the compressor wheel through both the first air bearing and the permanent magnet generator.

7. The vehicle as recited in claim 1, further comprising a diffuser arranged axially between the radial compressor and the compressor wheel.

8. The vehicle power module as recited in claim 1, the fuel module in fluid communication with the gas generator, the fuel module comprising:
   a charge of liquid fuel contained within a fuel pressure vessel; and
   a charge of compressed gas in fluid communication with the turbine through the fuel pressure vessel, the charge of compressed gas pressurizing the charge of liquid fuel.

9. The vehicle as recited in claim 1, wherein the turbine includes a single turbine stage.

* * * * *